US008068451B2

United States Patent
Wu

(10) Patent No.: US 8,068,451 B2
(45) Date of Patent: Nov. 29, 2011

(54) COMMUNICATION SYSTEM, USER DEVICE THEREOF AND SYNCHRONIZATION METHOD THEREOF

(75) Inventor: Chih-Hsiang Wu, Tao Yuan (TW)

(73) Assignee: HTC Corporation, Taoyuan (TW)

( * ) Notice: Subject to any disclaimer, the term of this patent is extended or adjusted under 35 U.S.C. 154(b) by 917 days.

(21) Appl. No.: 11/876,777

(22) Filed: Oct. 23, 2007

(65) Prior Publication Data

US 2008/0287105 A1 Nov. 20, 2008

Related U.S. Application Data

(63) Continuation-in-part of application No. 11/749,756, filed on May 17, 2007, now Pat. No. 7,817,595.

(51) Int. Cl.
*H04W 4/00* (2009.01)
(52) U.S. Cl. ........................................ 370/328
(58) Field of Classification Search .................. 455/410, 455/411; 370/328
See application file for complete search history.

(56) References Cited

U.S. PATENT DOCUMENTS

| | | | |
|---|---|---|---|
| 6,961,570 | B2 | 11/2005 | Kuo et al. |
| 6,980,795 | B1 | 12/2005 | Hermann et al. |
| 7,254,132 | B2 | 8/2007 | Takao et al. |
| 7,471,943 | B2 | 12/2008 | Chun et al. |
| 2003/0100291 | A1 | 5/2003 | Krishnarajah et al. |
| 2003/0157927 | A1* | 8/2003 | Yi et al. .............. 455/411 |
| 2004/0085932 | A1 | 5/2004 | Jiang |
| 2004/0180675 | A1 | 9/2004 | Choi et al. |
| 2005/0036619 | A1 | 2/2005 | Funnell et al. |
| 2005/0086466 | A1 | 4/2005 | Funnell et al. |

FOREIGN PATENT DOCUMENTS

| | | |
|---|---|---|
| EP | 1337125 | 8/2003 |
| JP | 2005-530021 A | 9/2002 |
| JP | 2005-518135 A | 6/2005 |
| WO | WO 00/28744 A2 | 5/2000 |
| WO | WO 03/069806 A1 | 8/2003 |

OTHER PUBLICATIONS

"Universal Mobile Telecommunications System (UMTS); Radio Resource Control (RRC) protocol specification (3GPP TS 25.331 version 3.21.0 Release 1999); ETSI TS 125 331" ETSI Standards, LIS, Sophia Antipolis Cedex, France, vol. 3-R2, No. V3.21.0, Dec. 1, 2004, XP014027667 ISSN: 0000-0001, Paragraphs [8.1.12] & [8.6. 3.4].

* cited by examiner

*Primary Examiner* — Lester Kincaid
*Assistant Examiner* — Nathan Mitchell
(74) *Attorney, Agent, or Firm* — Birch, Stewart, Kolasch & Birch, LLP

(57) ABSTRACT

A communication system, user device thereof, and a synchronization method thereof are provided. The communication system includes a user device and a wireless network. The wireless network transmits a RRC re-configuration message containing ciphering configuration information to a user device on a logical link. The user device suspends all measurement operation transmitting measurement report after receiving the RRC re-configuration message. The user device changes to a new ciphering configuration according to the RRC re-configuration message, and the wireless network changes to the new ciphering configuration. The user device transmits a RRC response message to respond the RRC re-configuration message to the wireless network. The user device resumes the measurement operation after changing to the new configuration.

24 Claims, 6 Drawing Sheets

COMMUNICATION SYSTEM, USER DEVICE THEREOF AND SYNCHRONIZATION METHOD THEREOF

CROSS-REFERENCE TO RELATED APPLICATION

This application is a continuation-in-part of a prior application Ser. No. 11/749,756, filed May 17, 2007. The entirety of the above-mentioned patent application is hereby incorporated by reference herein and made a part of this specification.

BACKGROUND OF THE INVENTION

1. Field of the Invention

The present invention generally relates to a synchronization method of communication, in particular, to a synchronization method adapted to be employed in the third generation mobile communication system for decreasing the call-dropping probability thereof.

2. Description of Related Art

With the arrival of the information era, demands for mobile audio, data communication, and kinds of mobile service are continuously increasing. Limited communication channels and insufficient transmission speed deter the concurrent communication system to be further developed. Therefore, the third generation mobile (3G) mobile communication, capable of providing higher frequency band utilizing efficiency and faster transmission service, has been developed accordingly.

FIG. 1 is a schematic diagram for illustrating a 3G mobile communication network. Referring to FIG. 1, a user equipment (UE) 10, e.g., a cellular phone or one of other handheld communication devices, communicates to a universal mobile telecommunication system radio access network (UTRAN) 11 via radio signals. The UTRAN 11 includes several radio network subsystems (RNS) 121, 122. Each of the RNSs is controlled by a radio network controller (RNC) 131, 132. Each RNC is connected with a plurality of node bases (Node B) 141-143. For example, as shown in FIG. 1, the RNS 121 includes RNCs 131 and Node Bs 141, 142, and the RNS 122 includes RNCs 132 and a Node B 143. The UTRAN 11 communicates with other telecommunication network, e.g., internet, via a core network (CN) 15 to provide 3G audio and/or data transmission service.

If moved or the wireless environment is changed, the UTRAN may shift UE among different RNSs, e.g., changing from connection to the RNS 121 to connect to the RNS 122. Such a procedure is called serving radio network subsystem (SRNS) relocation. In such a procedure, the UE 10 and the UTRAN 11 have to communicate to each other by synchronously using identical setting configuration. For example, the UE 10 and the UTRAN 11 must synchronously use data cipher corresponding to a new ciphering configuration to encrypt or decrypt the data.

FIG. 2 is a schematic diagram for illustrating the 3G mobile communication synchronization between a UE and a UTRAN. Referring to FIGS. 1 and 2, in an SRNS relocation procedure, the UTRAN transmits a radio resource control (RRC) message containing ciphering configuration information. After receiving the RRC re-configuration message containing the ciphering configuration information, the UE changes to the corresponding new ciphering configuration and transmits RRC response message to the UTRAN. For example, the UTRAN transmits a UTRAN mobility information RRC message containing downlink counter synchronization information to the UE. After receiving the aforementioned RRC message, the UE changes to the new configuration and feeds back a UTRAN mobility information confirm RRC message to respond the reception of the RRC message.

Because of the standard of 3G mobile communication, the UE is setup to measure e.g. wireless channel, according to which the RNC performs and controls channel source management. The obtained results also depend on the adjustment of the wireless channel quality factors for maintaining quality of different services. Therefore, the UE transmits a measurement report at predetermined times to the UTRAN according to the measurement event or the standard. However, the 3G mobile communication standard does not clearly define when the UTRAN should use its corresponding new ciphering configuration. As such, the UTRAN cannot correctly use the same data cipher of the UE to encode or decode the data, which is illustrated with reference to FIG. 4 as follows.

FIG. 3 is a schematic diagram for illustrating incorrectly encrypting/decrypting due to a synchronization failure between the UE and the UTRAN of 3G mobile communication. At the beginning, the UTKAN transmits UTRAN mobility information RRC message containing downlink counter synchronization information and ciphering mode info containing new ciphering configuration to the UE. However, after receiving the aforementioned RRC message, the UE most probably performs measurement operation (e.g. signal intensity measurement and/or buffer usage-status reporting) for sending measurement reports to the UTRAN at predetermined times triggered by measurement event or following the standard, before changing to the new ciphering configuration and feeds back a UTRAN mobility information confirm. In such a way, the UE will use the old configuration to transmit the measurement report. Unfortunately, if the UTRAN has already used the new ciphering configuration to receive the measurement report, the UE and the UTRAN is unsynchronized, thus causing incorrectly data encrypting/decrypting of the two parties. Affections of the incorrectly data encrypting/decrypting are illustrated below with reference to FIG. 4.

FIG. 4 is a schematic diagram for illustrating incorrectly data encrypting/decrypting of the UE and the UTRAN. Referring to FIG. 4, it is assumed that the measurement report transmitted by the UE is composed of protocol data units (PDUs) 401-402, while the UTRAN mobility information confirm is composed of PDUs 403-404 of the RLC entity. If the data are asynchronously encrypted/decrypted, the UTRAN would decrypt the received PUDs 405-408 into incorrect service data unit (SDU), e.g., SDU 411 and SDU 412 which would not form RRC messages. The measurement report includes measurement values of the wireless connection, and the UTRAN can select exchanging cells according to the measurement values. Most importance of all, the new configurations of data cipher between UE and UTRAN are not synchronous any more and the old configuration cannot be changed back. Therefore, the call-dropping probability is increased.

SUMMARY OF THE INVENTION

Accordingly, the present invention is directed to a synchronization method for a communication system. The synchronization method is adapted to ensure, in a system relocation procedure, a user device and a wireless network thereof to synchronously transmit data with a same configuration, thus avoiding data encrypting/decrypting errors, reducing transmission failure, and decreasing the call-dropping probability thereof.

The present invention is directed to provide a user device. In a system relocation procedure, the user device according to the present invention can be guaranteed to be synchronized with a wireless network to transmit data in a same configuration. In such a way, data encrypting/decrypting operation can be more reliable, and the transmission arrival rate and call sustaining rate are enhanced.

The present invention is directed to provide a communication system. In a system relocation procedure, a user device and a wireless network thereof to be synchronized with each other to transmit data in a same configuration can be ensured. In such a way, data encrypting/decrypting operation can be more reliable, and the transmission arrival rate and call sustaining rate are enhanced.

The present invention is directed to a ciphering configuration synchronization method for a communication system. The synchronization system comprises a user device and a wireless network. The wireless network transmits a RRC re-configuration message containing ciphering configuration information to the user device on a logical link. The user device suspends all measurement operation transmitting measurement report after receiving the ciphering configuration information. The user device changes to the new ciphering configuration according to the received ciphering configuration information. The wireless network changes to the new ciphering configuration. The user device resumes the measurement operation after changing to the new configuration.

The present invention is also directed to a user device, the user device includes a receiving/transmitting unit, a measurement unit and a synchronization control unit. The receiving/transmitting unit is adapted for receiving/transmitting electronic information. The measurement unit is adapted for performing measurement operation. The synchronization control unit is coupled to the receiving/transmitting unit and the measurement unit. When the receiving/transmitting unit receives a RRC re-configuration message containing ciphering configuration information from a wireless network, the synchronization control unit controls the measurement unit to suspend all the measurement operation transmitting measurement report; the receiving/transmitting unit changes to a new ciphering configuration according to the received RRC re-configuration message; and after the receiving/transmitting unit changes to the new ciphering configuration, the synchronization control unit controls the measurement unit to resume the measurement operation.

The present invention is also directed to a communication system. According to an embodiment of the present invention, the communication system includes a wireless network and a user device. The wireless network is adapted for providing radio access service. The user device is adapted for receiving/transmitting electronic information from/to the wireless network. When the user device receives a RRC re-configuration message containing a ciphering configuration information from the wireless network, the user device suspends all the measurement operation transmitting measurement report; the user device then changes to a new ciphering configuration according to the ciphering configuration information; the wireless network changes to the new ciphering configuration; and after the user device changing to the new ciphering configuration, the user device resumes the measurement operation.

The present invention is also directed to a synchronization method for a communication system. The synchronization system comprises a user device and a wireless network. The wireless network transmits a RRC re-configuration message containing ciphering configuration information to the user device on a logical link. The user device suspends transmitting messages other than the RRC response message on the logical link after receiving the RRC re-configuration message. The user device changes to a new ciphering configuration according to the RRC re-configuration message. The wireless network changed to the new ciphering configuration. The user device transmits a RRC response message to respond the RRC re-configuration message to the wireless network. The user device resumes transmitting messages other than the RRC response message on the logical link.

The present invention is also directed to a user device comprising a receiving/transmitting unit and a synchronization control unit. The receiving/transmitting unit adapted for receiving/transmitting electronic information. The synchronization control unit coupled to control the receiving/transmitting unit. Wherein, the receiving/transmitting unit suspends transmitting-messages other than the RRC response message on the logical link, changes to a new ciphering configuration according to the received RRC re-configuration message, transmits a RRC response message to respond the RRC re-configuration message to the wireless network on the logical link, and resumes messages other than the RRC response message on the logical link when the receiving/transmitting unit receives a RRC re-configuration message containing ciphering configuration information on a logical link from the wireless network.

According to the present invention, upon receiving the ciphering configuration information, the user device suspends all the measurement operation transmitting measurement report, then changes to a new ciphering configuration according to the ciphering configuration information, the wireless network changes to the new ciphering configuration, and after changing to the new ciphering configuration, the user device resumes the measurement operation. Thus, reducing transmission failure and decreasing the call-dropping probability thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
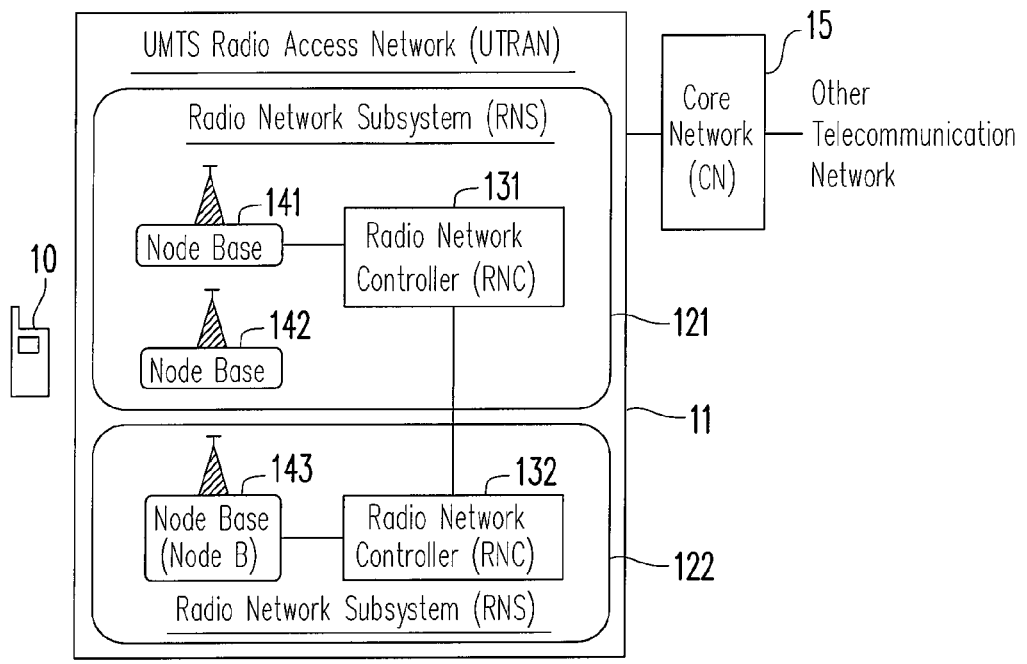
FIG. 1 is a schematic diagram for illustrating a 3G mobile communication network.
Figure 2:
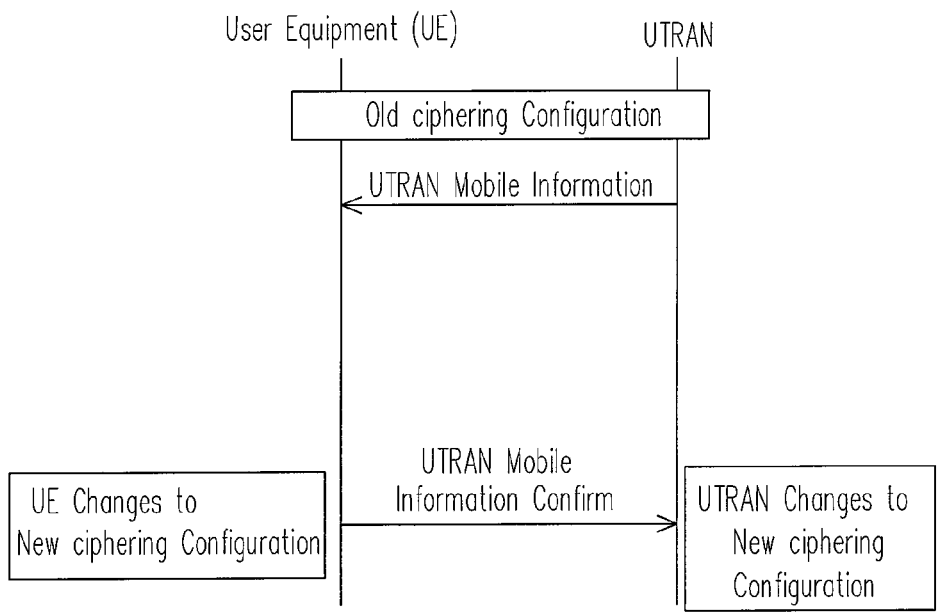
FIG. 2 is a schematic diagram for illustrating the 3G mobile communication synchronization between a UE and a UTRAN.
Figure 3:
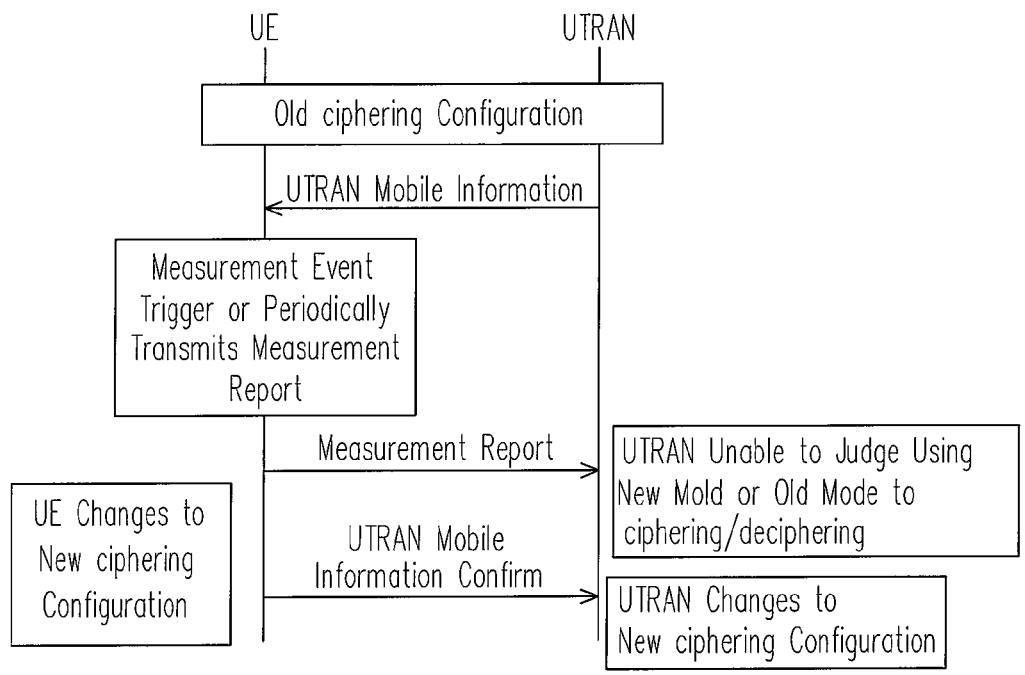
FIG. 3 is a schematic diagram for illustrating incorrectly encrypting/decrypting due to a synchronization failure between the UE and the UTRAN of 3Gmobile communication.
Figure 4:
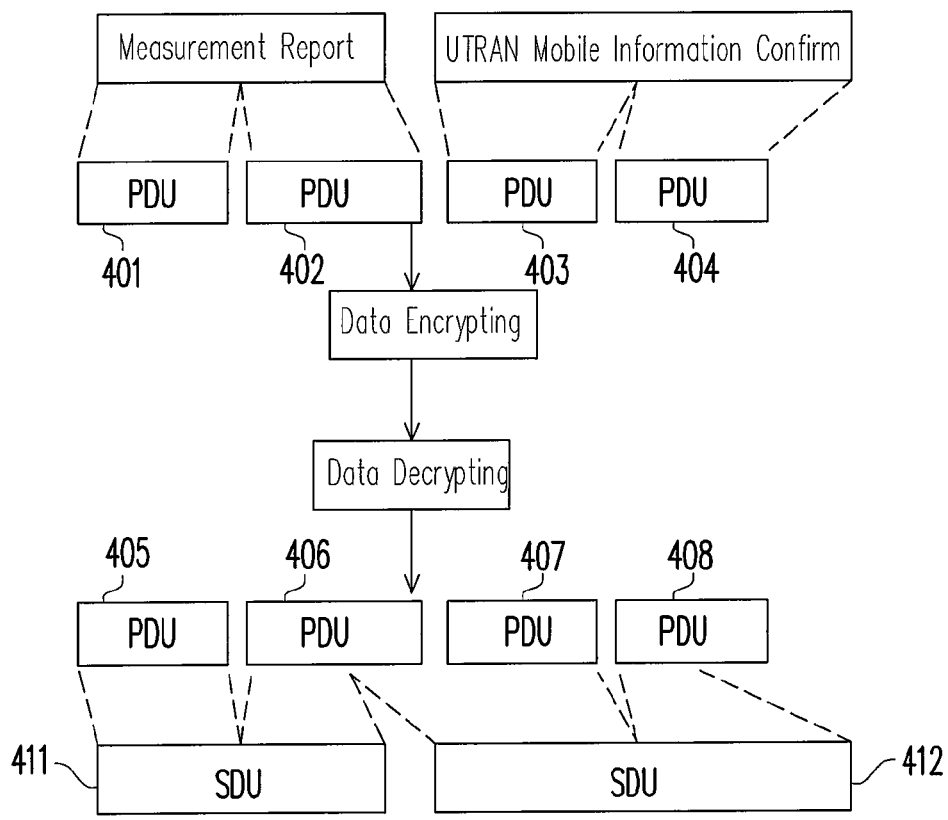
FIG. 4 is a schematic diagram for illustrating incorrect data encrypting/decrypting of the UE and the UTRAN.

Reference will now be made in detail to the present preferred embodiments of the invention, examples of which are illustrated in the accompanying drawings. Wherever possible, the same reference numbers are used in the drawings and the description to refer to the same or like parts. The present invention can be applied to any communication system. In the following embodiments, the present invention is applied to the third generation (3G) mobile communication system.

For failing to clearly define a time at which the user device and the wireless network use a new configuration (e.g. new ciphering configuration), conventional art often fail to synchronize the ciphering configurations of the user device and the wireless network during a system relocation procedure, which is likely to increase the system transmission failure rate and the call-dropping probability thereof. For solving the aforementioned problem of the conventional art, the present invention provide a scheme and/or a method for synchronizing a communication system, in that the user device and the wireless network, when need to perform a system relocation procedure, can be synchronously refreshed to a new ciphering configuration, and thereby reduce the transmission failure rate and the call dropping probability associated therewith.

Figure 5:
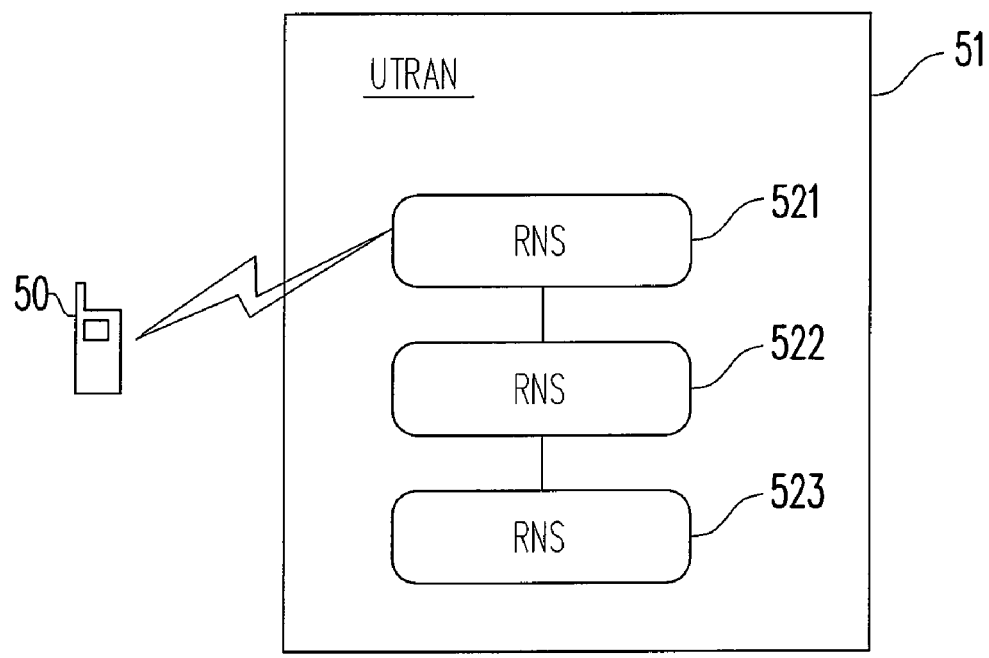
FIG. 5 is a diagrams illustrating a communication system according an embodiment of the present invention.
Figure 6:
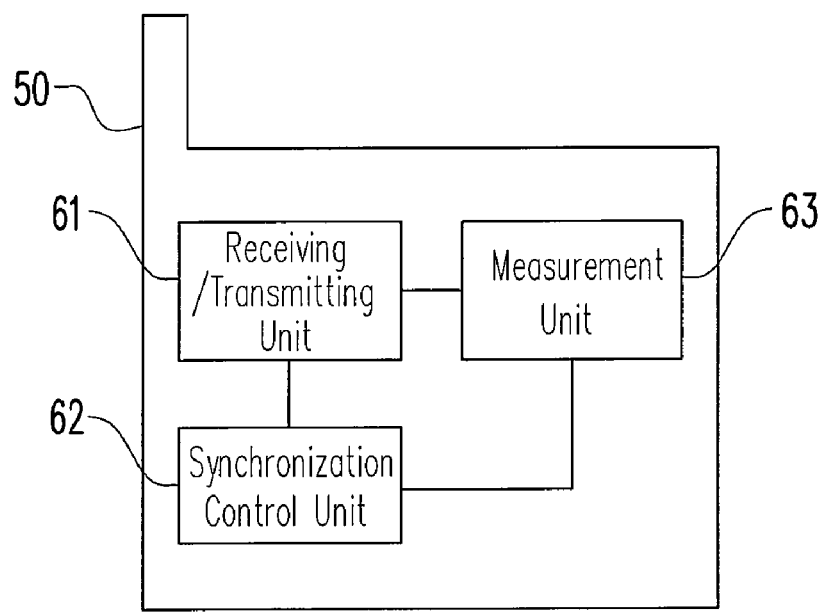
FIG. 6 is a circuit diagram for illustrating a UE 50 according an embodiment of the present invention.

FIG. 5 is a diagram illustrating a communication system according an embodiment of the present invention. Referring to FIG. 5, a communication system according to an embodiment of the present invention includes a user device (e.g. UE 50 in 3G system) and a wireless network (e.g. UTRAN 51 in 3G system). The UTRAN 51 includes a plurality of subsystem (e.g. RNS 521-523 in 3G system). The UTRAN 51 provides radio access service to the UE 50. The UE 50 and the UTRAN 51 communicate with each other by transmitting/receiving electronic information there between. FIG. 6 is a circuit diagram for illustrating a UE 50 according an embodiment of the present invention. Referring to FIG. 6, the UE 50 of the present embodiment includes a transmitting/receiving unit 61, a measurement unit 63 and a synchronization control unit 62. The measurement unit 63 coupled to the transmitting/receiving unit 61 is adapted for performing measurement operation, and for transmitting measurement report of the measurement operation to the UTRAN 51 through the transmitting/receiving unit 61. The synchronization control unit 62 is coupled to the transmitting/receiving unit 61 and the measurement unit 63 for controlling a configuration (e.g. ciphering configuration) of the UE 50. It should be noted that in the present embodiment, details of the transmitting/receiving unit 61, e.g., antenna, modulator, encoder/decoder is not described as those of ordinary skill in the art may be easily construct such a transmitting/receiving unit 61 in accordance with the practical demand. Details of the present embodiment are discussed below with reference to FIGS. 5 and 6.

In this embodiment, when a system relocation (e.g. SRNS relocation in 3G system) procedure is initiated, the UTRAN 51 transmits a RRC re-configuration message containing a ciphering configuration information. The transmitting/receiving unit 61 of the UE 50 then receives the ciphering configuration information. The synchronization control unit 62 controls the measurement unit 63 to suspend all the measurement operation transmitting measurement report. Therefore, the transmitting/receiving unit 61 suspends to transmit measurement report on logical link, e.g. radio bearer (RB2) in 3G system. Thereafter the transmitting/receiving unit 61 changes the ciphering configuration according to the RRC re-configuration message, i.e. the transmitting/receiving unit 61 changes to a new ciphering configuration according to the configuration information of the RRC re-configuration message. The receiving/transmitting unit 61 transmits a RRC response message to respond the RRC re-configuration message to the wireless network on the logical link. The RB2 is a kind of logical link for signaling, i.e. RRC messages in 3G UMTS system. Data (e.g. voice, TCP/IP packets) and signaling messages are multiplexed in physical layer.

After the transmitting/receiving unit 61 transmits the RRC response message, the synchronization control unit 62 then controls the measurement unit 63 to resume the measurement operation. In such a way, the UE 50 and the UTRAN 51 can communicate with each other by new ciphering configurations corresponding to each other. Furthermore, the transmitting/receiving unit 61 can also be subject to feed back an acknowledgement message to the UTRAN 51 after receiving the ciphering configuration information, and thereafter the ciphering configuration of the UTRAN 51 is changed according to the ciphering configuration information after the acknowledgement message is received. Wherein, the acknowledgement message is, for example, a RLC acknowledgement message in 3G UMTS system. This way, the synchronous communication with the new ciphering configuration between the UE 50 and the UTRAN 51 can be ensured.

For purpose of simplification, legends of below discussed drawing have been abbreviated, for example the UE discussed below is designated as the same of the UE 50 of FIG. 5, and the UTRAN is designated as the same of UTRAN 51 of FIG. 5.

Figure 7:
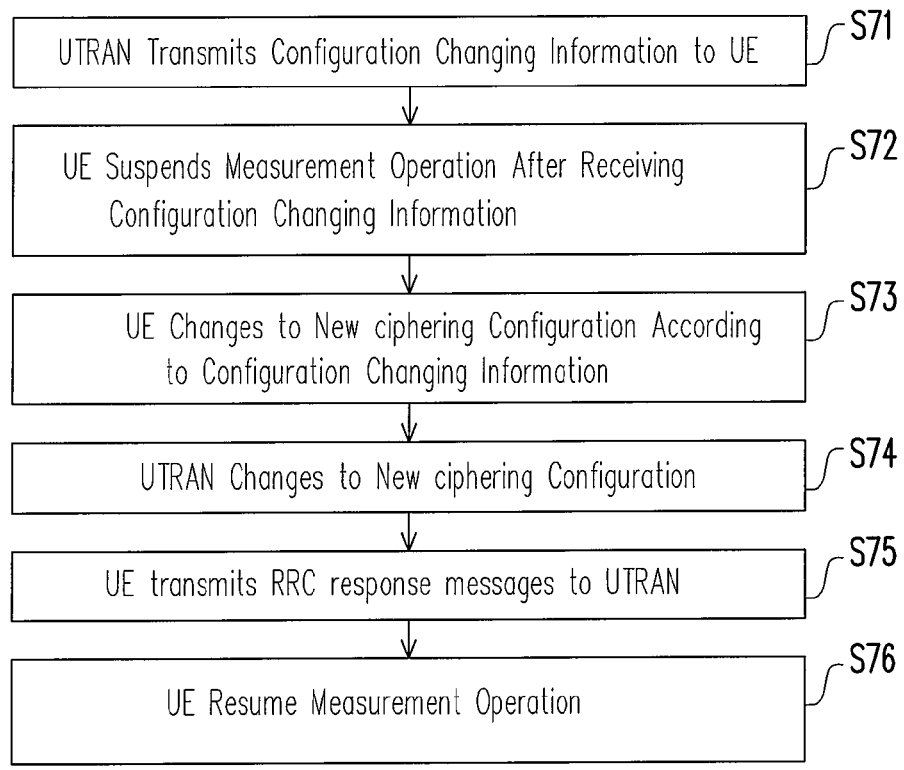
FIG. 7 is a flow chart for illustrating a synchronization method of the communication system according to an embodiment of the present invention.

FIG. 7 is a flow chart for illustrating a synchronization method of the communication system according to an embodiment of the present invention. Referring to FIG. 7, first, at step S71, the UTRAN transmits a RRC re-configuration message containing ciphering configuration information to the UE on a logical link (e.g. RB2). Next, at step S72, after the UE receives the ciphering configuration information, the UE suspends all the measurement operation transmitting measurement report on RB2. At step S73, the UE changes to a new ciphering configuration according to the RRC re-configuration message (or the ciphering configuration information). Next, at step S74, the UTRAN changes to the new ciphering configuration. The UE performs the step S75 to transmit a RRC response message to respond the RRC re-configuration message to the UTRAN on RB2. Finally, at step S76, after the UE transmits the RRC response message, the UE resumes measurement operation.

Figure 8:
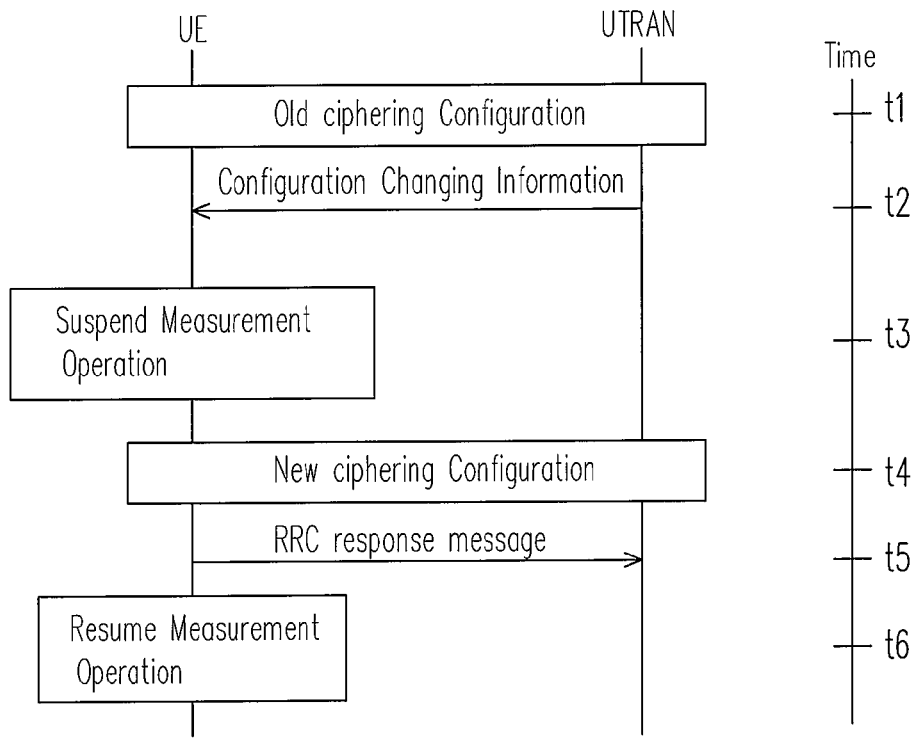
FIG. 8 is a schematic diagram for illustrating a synchronization method of the communication system according to an embodiment of the present invention.

FIG. 8 is a schematic diagram for illustrating a synchronization method of the communication system according to an embodiment of the present invention. Referring to FIGS. 7 and 8, a preferred time for initiating the synchronization method according to the embodiment of the present invention is the time that the UE needs to change an RNS in connection with the UTRAN in an SRNS relocation procedure. At the beginning, i.e., time t1, both of the UE and the UTRAN use an old ciphering configuration, e.g., using data cipher corresponding to the old ciphering configuration to encrypt/decrypt. As the SRNS relocation procedure starts, the UTRAN transmits a RRC re-configuration message containing ciphering configuration information to the UE, as illustrated at time t2 of FIG. 8 (step S71) as illustrated in FIG. 7.

According to the current standard, the UTRAN can select any RRC re-configuration message, such as RADIO BEARER SETUP message, RADIO BEARER RELEASE message, TRANSPORT CHANNEL RECONFIGURATION message, PHYSICAL CHANNEL RECONFIGURATION message, CELL UPDATE CONFIRM message, URA UPDATE CONFIRM message, or UTRAN MOBILITY INFORMATION message, to transmit a downlink counter synchronization information and ciphering mode info as ciphering configuration information to make UE perform SRNS relocation. The UTRAN can also employ other RRC re-configuration message, such as RADIO BEARER RECONFIGURATION message to transmit new UTRAN radio network temporary identity (new U-RNTI) information and ciphering mode info as ciphering configuration information to make UE perform SRNS relocation.

When the UE receives the aforementioned ciphering configuration information, the UE suspends all measurement operation transmitting measurement report (time 3 as illustrated in FIG. 8, step S72 as illustrated in FIG. 7). The measurement operation may include an intra-frequency measurement, an inter-frequency measurement, an inter-RAT measurement, a quality measurement, a UE positioning measurement, a traffic volume measurement or a UE internal measurement. Therefore, the UE suspends to transmit measurement report for the measurement event or the aforementioned standard. Next, at step S73, the UE changes to the new ciphering configuration on RB2 according to the ciphering configuration information as illustrated in FIG. 7 at the time t4 as illustrated in FIG. 8. The UTRAN changes to the new ciphering configuration on RB2 (step S74) at the time t2 as illustrated in FIG. 8. After the UE changes to the new ciphering configuration on RB2 at the time t4, the UE transmits a RRC response message to respond the RRC re-configuration message to the UTRAN (time 5 as illustrated in FIG. 8, step S75 as illustrated in FIG. 7). Next, at step S76, after UE transmits the RRC response message on RB2, the UE resumes the measurement operation as illustrated in FIG. 7 at the time t6 as illustrated in FIG. 8.

In the present embodiment, the UTRAN can change to the new ciphering configuration after transmitting the RRC re-configuration changing message containing ciphering configuration information (step S74) as illustrated in FIG. 7 at the time t2 as illustrated in FIG. 8. Detail operations of above will be discussed below. As such, the UE and the UTRAN are capable of communicating with each other consistent with the new ciphering configuration, e.g., encrypting/decrypting according to a cipher instructed by the ciphering configuration information to decrease the system transmission failure rate and the call-dropping probability thereof.

It should be noted that the above exemplarily embodiments illustrates a preferred scheme according to the present invention, while the steps of S71 through S75 are not limited thereto as such. For example, those of ordinary skill in the art may also learn from the above description that synchronization between the UE and the UTRAN can also be obtained by the UTRAN (for example step of S74) to change to the new ciphering configuration after performing the step S71, and then the UE performs the steps of S72, S73, and S75 in that order. Furthermore, that the reception of the changing configuration information by the UE is ensured to avoid the failure of UE to receive the ciphering configuration information due to the environmental factor, and those of ordinary skill in the art can also design the UTRAN to wait until the UE feeds back an RLC acknowledgement message and thereafter changes to the new ciphering configuration.

Consider the case that measurement report sending during SRNS Relocation procedure. Another embodiment of the present invention will be described below with reference to FIG. 9 and 10.

Figure 9:
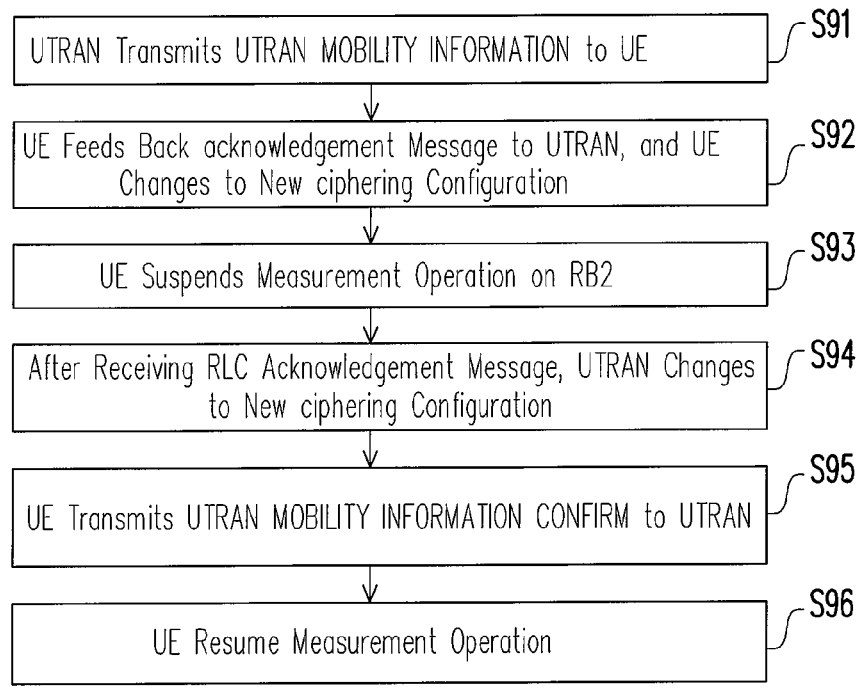
FIG. 9 is a flow chart for illustrating a synchronization method of the communication system according to another embodiment of the present invention.
Figure 10:
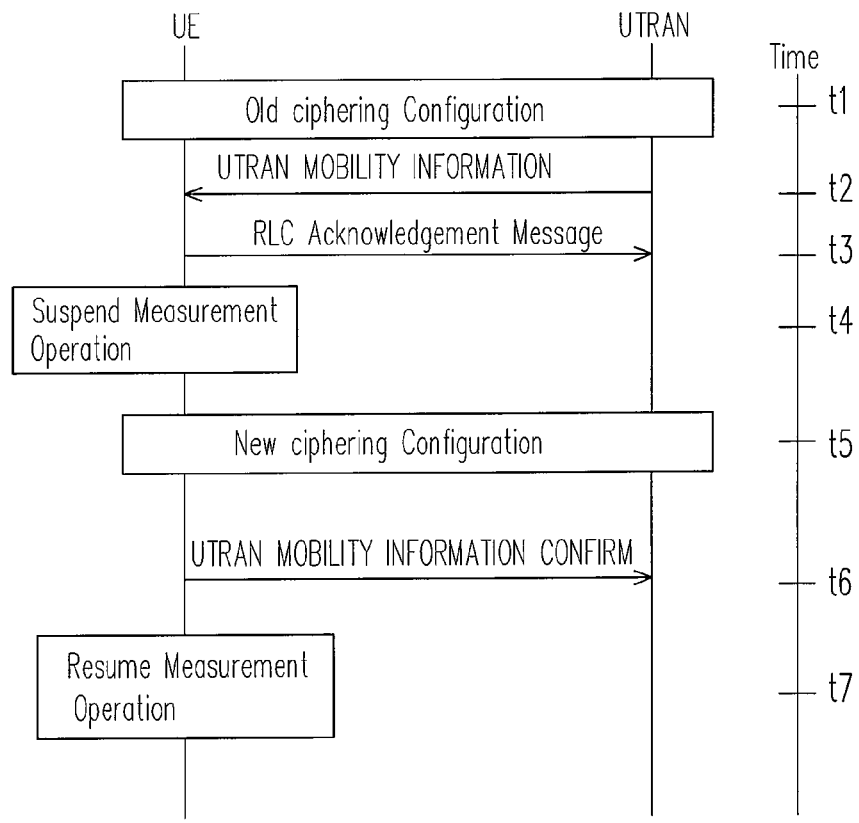
FIG. 10 is a schematic diagram for illustrating a synchronization method of the communication system according to another embodiment of the present invention.

FIG. 9 is a flow chart for illustrating a synchronization method of the communication system according to another embodiment of the present invention. FIG. 10 is a schematic diagram for illustrating a synchronization method of the communication system according to another embodiment of the present invention. Referring to FIGS. 9 and 10, at time t1 as shown in FIG. 10, the user device (e.g. UE in 3G system) and the wireless network (e.g. UTRAN in 3G system) communicate under an old ciphering configuration. Next, at the time t2 in FIG. 10, the UTRAN performs the step of S91 to transmit RRC re-configuration message containing ciphering configuration information (e.g. UTRAN MOBILITY INFORMATION massage in 3G system) to the UE. Assume the UTRAN MOBILITY INFORMATION massage includes the IE "downlink counter synchronization information" for triggering a system relocation (e.g. SRNS Relocation in 3G system) procedure and IE "Ciphering Mode Info" to set up new ciphering configuration. After the UE receives the UTRAN MOBILITY INFORMATION massage, the UE performs the step S92 to feed back a RLC acknowledgement message to the UTRAN and change to a new ciphering configuration according to the UTRAN MOBILITY INFORMATION massage at time of t3 in FIG. 10.

Next, at time t4 in FIG. 10, the UE performs the step of S93 to suspend all measurement operation transmitting measurement report. The measurement operation may include an intra-frequency measurement, an inter-frequency measurement, an inter-RAT measurement, a quality measurement, a UE positioning measurement, a traffic volume measurement or a UE internal measurement. Therefore, the UE suspends to transmit measurement report for the measurement event or the aforementioned standard. Next, at step S94 and at time t4, the UTRAN changes to the new ciphering configuration after receiving the RLC acknowledgement message. The UE performs the step S95 to transmit a RRC response message (e.g. UTRAN MOBILITY INFORMATION CONFIRM massage in 3G system) corresponding to the RRC re-configuration message at time t6. Wherein, the UE applies to the new ciphering configuration of the logical link (e.g. RRC RB2 in 3G system) since transmitting the RRC response message. Finally, the UE performs the step S96 to resume the measurement operation at time t7. In this manner, the UE and the UTRAN need not use unsynchronized ciphering configuration, which usually causes data ciphering/deciphering errors.

Figure 11:
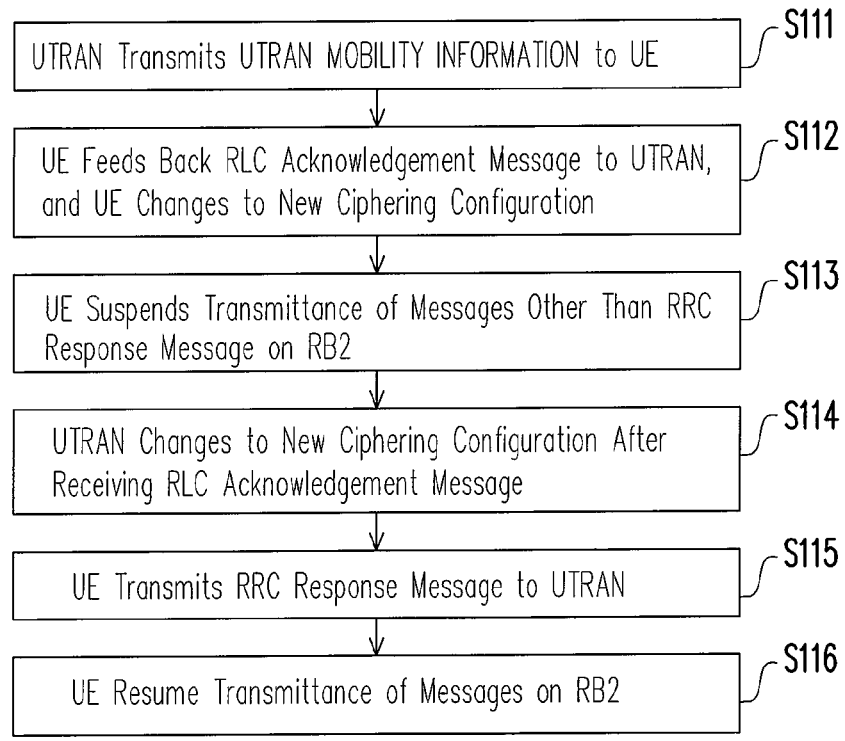
FIG. 11 is a flow chart for illustrating a synchronization method of the communication system according to another embodiment of the present invention.
Figure 12:
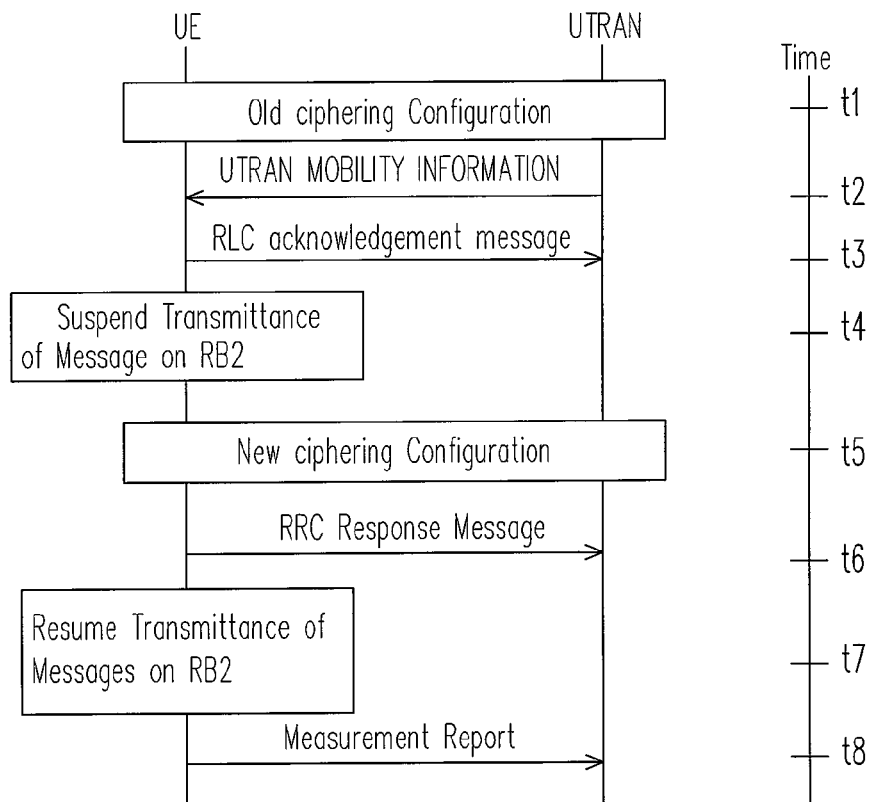
FIG. 12 is a schematic diagram for illustrating a synchronization method of the communication system according to another embodiment of the present invention.

Another embodiment of the present invention will be described below with reference to FIG. 11 and 12. FIG. 11 is a flow chart for illustrating a synchronization method of the communication system according to another embodiment of the present invention. FIG. 12 is a schematic diagram for illustrating a synchronization method of the communication system according to another embodiment of the present invention. Referring to FIGS. 11 and 12, at time t1 as shown in FIG. 12, the user device (e.g. UE in 3G system) and the wireless network (e.g. UTRAN in 3G system) communicate under an old ciphering configuration. Next, at the time t2 in FIG. 12, the UTRAN performs the step of S111 to transmit RRC re-configuration message containing ciphering configuration information (e.g. UTRAN MOBILITY INFORMATION massage in 3G system) to the UE on a logical link (e.g. RRC RB2 in 3G system). Assume the UTRAN MOBILITY INFORMATION massage includes the IE "downlink counter synchronization information" for triggering a system relocation (e.g. SRNS Relocation in 3G system) procedure and IE "Ciphering Mode Info" to set up new ciphering configuration. The RRC re-configuration message can be a RADIO BEARER RECONFIGURATION message containing a new UTRAN radio network temporary identity (U-RNTI) for triggering a system relocation (e.g. SRNS Relocation in 3G system) procedure and IE "Ciphering Mode Info" to set up new ciphering configuration. After the UE receives the UTRAN MOBILITY INFORMATION massage, the UE performs the step S112 to change to a new ciphering configuration according to the UTRAN MOBILITY INFORMATION massage and feed back a RLC acknowledgement message to the UTRAN at time of t3 in FIG. 12. In other embodiment, the UE changes to the new ciphering configuration of RB2 since transmitting the RRC response message.

Next, at time t4 in FIG. 12, the UE performs the step of S113 to suspend transmission of messages other than the RRC response message on RB2. If a measurement event is triggered or periodical reporting is generated at time t4, then the transmission of MEASUREMENT REPORT message is suspended. At step S114, the UTRAN changes to the new ciphering configuration after receiving RLC acknowledgement message at time t3. Next, at step S115 and at time t6, the UE transmits a RRC response message (e.g. UTRAN MOBILITY INFORMATION CONFIRM massage in 3G system) to respond the RRC re-configuration message to the UTRAN. Finally, the UE performs the step S116 to resume transmission of the messages other than the RRC response message on RB2 at time t7. Therefore, the UE feeds back measurement information (e.g. the MEASUREMENT REPORT message) to the UTRAN at the time t8 as illustrated in FIG. 12. The measurement report can be an intra-frequency measurement report, an inter-frequency measurement report, an inter-RAT measurement report, a quality measurement report, a UE positioning measurement report, a traffic volume measurement report or a UE internal measurement report. In this manner, the UE and the UTRAN need not use unsynchronized ciphering configuration, which usually causes data ciphering/deciphering errors.

In summary, according to the embodiments of the present invention, as the UE receives a RRC re-configuration message containing ciphering configuration information, the UE suspends all measurement operation transmitting measurement report. The UE and the UTRAN change to a new ciphering configuration according to the received ciphering configuration information. After changing to the new ciphering configuration, the UE resumes the measurement operation. In this manner, the UE and the UTRAN are guaranteed, in an SRNS relocation procedure, to synchronously transmit data with a same ciphering configuration. Thus, data enciphering/deciphering errors are effectively avoided to reduce failure of transmission of electronic information, and decrease the call-dropping probability thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronization method for a communication system, the synchronization system comprising a user device and a wireless network, the synchronization method comprising:

transmitting a RRC re-configuration message containing ciphering configuration information to the user device on a logical link using the wireless network;

suspending all measurement operation transmitting measurement report using the user device after receiving the RRC re-configuration message;

changing to the new ciphering configuration according to the RRC re-configuration message using the user device;

changing to the new ciphering configuration using the wireless network;

transmitting a RRC response message to respond the RRC re-configuration message to the wireless network using the user device; and resuming the measurement operation after changing to the new configuration using the user device.

2. The synchronization method according to claim 1, wherein the user device applies the new ciphering configuration of the logical link since transmitting the RRC response message.

3. The synchronization method according to claim 1 further comprising:

feeding back an acknowledgement message to the wireless network after receiving the RRC re-configuration message using the user device.

4. The synchronization method according to claim 3 further comprising a step of changing the wireless network to the new ciphering configuration after the wireless network receives the acknowledgement message.

5. The synchronization method according to claim 1, wherein the RRC re-configuration message makes the user device perform Serving Radio Network Subsystem (SRNS) relocation.

6. The synchronization method for a communication system according to claim 1, wherein the measurement operation includes an intra-frequency measurement, an inter-frequency measurement, an inter-RAT measurement, a quality measurement, a UE positioning measurement, a traffic volume measurement or a UE internal measurement.

7. A user device, comprising:

a receiving/transmitting unit, adapted for receiving/transmitting electronic information;

a measurement unit, adapted for performing measurement operation; and a synchronization control unit, coupled to control the receiving/transmitting unit and the measurement unit, wherein when the receiving/transmitting unit receives a RRC re-configuration message containing ciphering configuration information on a logical link from a wireless network, the synchronization control unit controls the measurement unit to suspend all the measurement operation transmitting measurement report on the logical link; the receiving/transmitting unit changes to a new ciphering configuration according to the received RRC re-configuration message; the receiving/transmitting unit transmits a RRC response message to respond the RRC re-configuration message to the wireless network on the logical link, and the synchronization control unit controls the measurement unit to resume all the measurement operation transmitting measurement report.

8. The user device according to claim 7, wherein when the receiving/transmitting unit applies the new ciphering configuration of the logical link since transmitting the RRC response message.

9. The user device according to claim 7, wherein the user device performs Serving Radio Network Subsystem (SRNS) relocation in accordance with the RRC re-configuration message.

10. The user device according to claim 7, wherein the measurement operation includes an intra-frequency measurement, an inter-frequency measurement, an inter-RAT measurement, a quality measurement, a UE positioning measurement, a traffic volume measurement or a UE internal measurement.

11. A communication system, comprising:
a wireless network, adapted for providing radio access service; and
a user device, for receiving/transmitting electronic information from/to the wireless network; wherein when the user device receives a RRC re-configuration message containing ciphering configuration information from the wireless network on a logical link, the user device suspends all the measurement operation transmitting measurement report on the logical link; the user device then changes to a new ciphering configuration according to the received ciphering configuration information; the wireless network changes to the new ciphering configuration; the user device transmits a RRC response message to respond the RRC re-configuration message to the wireless network on the logical link, and the user device resumes all the measurement operation transmitting measurement report.

12. The user device according to claim 11, wherein when the user device applies the new ciphering configuration of the logical link since transmitting the RRC response message.

13. The communication system according to claim 11, wherein the user device feeds back an acknowledgement message to the wireless network when the user device receives the RRC re-configuration message; and the wireless network changes to the new ciphering configuration after the wireless network receives the acknowledgement message.

14. The communication system according to claim 11, wherein the user device performs Serving Radio Network Subsystem (SRNS) relocation in accordance with the RRC re-configuration message.

15. The communication system according to claim 11, wherein the measurement operation includes an intra-frequency measurement, an inter-frequency measurement, an inter-RAT measurement, a quality measurement, a UE positioning measurement, a traffic volume measurement or a UE internal measurement.

16. A synchronization method for a communication system, the synchronization system comprising a user device and a wireless network, the synchronization method comprising:
transmitting a RRC re-configuration message containing ciphering configuration information to the user device on a logical link using the wireless network;
suspending transmitting messages other than the RRC response message on the logical link using the user device after receiving the RRC re-configuration message;
changing to a new ciphering configuration according to the RRC re-configuration message using the user device;
changing to the new ciphering configuration using the wireless network;
transmitting a RRC response message to respond the RRC re-configuration message to the wireless network using the user device; and
resuming transmitting messages other than the RRC response message on the logical link using the user device.

17. The synchronization method according to claim 16, wherein the messages other than the RRC response message on the logical link include a measurement report.

18. The synchronization method according to claim 16, wherein the user device changes to the new ciphering configuration of the logical link since transmitting the RRC response message.

19. The synchronization method according to claim 16 further comprising:
feeding back an acknowledgement message to the wireless network after receiving the RRC re-configuration message using the user device; and
a step of changing the wireless network to the new ciphering configuration after the wireless network receives the acknowledgement message.

20. The synchronization method according to claim 16, wherein the RRC re-configuration message makes the user device perform Serving Radio Network Subsystem (SRNS) relocation.

21. A user device, comprising:
a receiving/transmitting unit, adapted for receiving/transmitting electronic information; and
a synchronization control unit, coupled to control the receiving/transmitting unit, wherein when the receiving/transmitting unit receives a RRC re-configuration message containing ciphering configuration information on a logical link from a wireless network, the receiving/transmitting unit suspends transmitting messages other than the RRC response message on the logical link; the receiving/transmitting unit changes to a new ciphering configuration according to the received RRC re-configuration message; the receiving/transmitting unit transmits a RRC response message to respond the RRC re-configuration message to the wireless network on the logical link; and the receiving/transmitting unit resumes messages other than the RRC response message on the logical link.

22. The synchronization method according to claim 21, wherein the receiving/transmitting unit suspends transmitting messages other than the RRC response message on the logical link using the user device after receiving the RRC re-configuration message; and the messages other than the RRC response message on the logical link include a measurement report.

23. The user device according to claim 21, wherein when the receiving/transmitting unit applies the new ciphering configuration of the logical link since transmitting the RRC response message.

24. The user device according to claim 21, wherein the user device performs Serving Radio Network Subsystem (SRNS) relocation in accordance with the RRC re-configuration message.

* * * * *